US006785658B1

(12) United States Patent
Merker et al.

(10) Patent No.: US 6,785,658 B1
(45) Date of Patent: Aug. 31, 2004

(54) LEASE CANCELLATION PROCESS AND SYSTEM

(75) Inventors: David S. Merker, Downingtown, PA (US); Raju S. Kakarlapudi, Devon, PA (US); Charles Wilson, West Chester, PA (US)

(73) Assignee: General Electric Capital Corporation, Stamford, CT (US)

( * ) Notice: Subject to any disclaimer, the term of this patent is extended or adjusted under 35 U.S.C. 154(b) by 0 days.

(21) Appl. No.: 09/471,731

(22) Filed: Dec. 23, 1999

(51) Int. Cl.⁷ .............................................. G06F 17/60
(52) U.S. Cl. .......................................... 705/1; 705/35
(58) Field of Search ................................ 705/1; 707/35

(56) References Cited

U.S. PATENT DOCUMENTS 5,696,907 A * 12/1997 Tom ........................... 395/238

FOREIGN PATENT DOCUMENTS

JP 410143564 A * 5/1998 ........... G05F/17/60
WO WO 01/67210 A2 * 3/2000

OTHER PUBLICATIONS

International Banking Regulator newsletter, Lisa Troshinsky, Sep. 23, 1996, p. 1; vol. 9, No. 36.*
NCUA Watch newsletter, anonymous, Jul. 15, 1996, p. 1; vol. 9, No. 28.*
Regulatory Compliance Watch newsletter, anonymous, Jul. 15, 1996 p. 1, vol. 9, No. 28.*
Regulatory Compliance Watch newsletter, anonymous, Nov. 13, 1995 p. 5; vol. 5, No. 43.*

* cited by examiner

Primary Examiner—John G. Weiss
Assistant Examiner—Michael J. Fisher
(74) Attorney, Agent, or Firm—Buckley, Maschoff & Talwalkar LLC

(57) ABSTRACT

System and method for managing the cancellation of equipment lease contracts on a date prior to the date set forth in the contract (Dt) wherein a database of lease contracts comprising a plurality of account entries is maintained, each account entry including lease contract information comprising the name of the lessor, the normal contract lease termination date (Dt), the amount (Pa) and number (Pn) of periodic payments, the remaining time on the contract at termination (Rt), the identity (Ei) and class (Ec) of equipment which is the subject matter of the lease contract. Another database comprises all classes of equipment (Ec) owned by the lessor and the number of items of each class of equipment presently in inventory, the number of items of the class which are presently leased, the historical utilization rate of the class (Hu), the historical lease rate (Hlr), and the historical time to lease items of the class following return of item of the class to inventory after a previous lease is terminated (Ht). The computer calculates the value of the remaining periodic payments according to the lease contract (Rv) and a breakeven amount (Bv). The person handling the termination for the lessor then enters a termination fee, Ft, of either Rv, Bv, or an amount in between.

7 Claims, 2 Drawing Sheets

LEASE CANCELLATION PROCESS AND SYSTEM

BACKGROUND OF THE INVENTION

This invention relates to methods and systems for leasing equipment, and particularly to the management of lease cancellations.

For leasing companies with large volumes of leased items, management of the leasing process must be performed with the assistance of a computer because the leasing process involves a large volume of information pertaining to inventory, items which are leased, the varying terms of each lease contract, periodic payments due and received, billing, and calculation of the appropriate lease payment to achieve a targeted profitability. One area of the management of large numbers of leases to which automation has not been achieved to date is the resolution of early returns of leased items. By early returns, we mean situations where the lessee returns the leased item to the lessor prior to the normal termination of the lease contract, and the lessor needs to determine the amount to be collected from the lessee. Normally the lessee wishes to pay nothing for the remaining period of the lease since the item is not being used, even though the lease contract specifies a formula for calculating the amount due upon early termination. In the industry, the amount due in such situations according to the contract formula is frequently merely the starting point of a negotiation.

Negotiation of the penalty for early returns is a fact of life in the leasing industry. Since the lessor's agent who is authorized to negotiate the penalty for the early return usually does not have access to the complex data and formulas involved in determining the real cost to the lessor due to an early return, the lessor is at a disadvantage in such negotiations. Many of the early return situations are resolved without the knowledge of the actual reduction in profit to the lessor due to the early return.

There has therefore been a need to provide an automated method for calculating the real loss, or projected loss, due to the early return, and to make that information readily available to the lessor's personnel authorized to negotiate with the lessee regarding the amount of compensation, i.e., "penalty," to be paid for the early return.

Furthermore, for high volume leasing companies, process quality improvements can result in higher levels of profitability. There is a need in the area of early returns to develop measurement methods so that weaknesses in the process can be identified and improved or corrected.

SUMMARY OF THE INVENTION

This need, and others which will become apparent from the following disclosure and drawings, is addressed by the present invention which in one aspect comprises a computer assisted method for managing the cancellation of equipment lease contracts on a date prior to the date set forth in the contract comprising creating a database of lease contracts comprising a plurality of account entries, each account entry including lease contract information comprising the name of the lessor (Nl), the normal contract lease termination date (Dt), the amount (Pa) and remaining number (Pn) of periodic payments, the remaining time on the contract at termination (Rt), the identity (Ei) and class (Ec) of equipment which is the subject matter of the lease contract; calculating the number of items of the class of equipment presently in inventory, the number of items of the class which are presently leased, the historical utilization rate of the class (Hu), the historical lease rate (Hlr), and the historical time to lease items of the class following return of item of the class to inventory after a previous lease is terminated (Ht); inputting data upon termination of a lease comprising the identity (Ei) of the leased item and the reason code for the termination of the lease (Rc); calculating the sum of the remaining periodic payments (Rp) according to the lease contract wherein Rp=Pa*Pn, (or Rp=Pa*Rt if Pa is defined as the payment rate in dollars per month), calculating a breakeven amount (Bv) according to a formula as follows: Bv={Rp−[(Rt−Ht)*Hlr]*Hu}; and billing the lessee a termination fee (Ft) no higher than Rp and no lower than Bv.

In another aspect, the invention comprises a system for managing the cancellation of equipment lease contracts on a date prior to the date set forth in the contract comprising a database of lease contracts comprising a plurality of account entries, each account entry including lease contract information comprising the name of the lessor, the normal contract lease termination date (Dt), the amount (Pa) and remaining number (Pn) of periodic payments, the remaining time on the contract at termination (Rt), the identity (Ei) and class (Ec) of equipment which is the subject matter of the lease contract; a database of all classes of equipment (Ec) owned by the lessor, each entry comprising the identity of the class of equipment, the number of items of the class of equipment presently in inventory, the number of items of the class which are presently leased, the historical utilization rate of the class (Hu), the historical lease rate (Hlr), a discount rate to compensate for lease rate to rental rate conversion (Dr), and the historical time to lease items of the class following return of item of the class to inventory after a previous lease is terminated (Ht); a client workstation for inputting data upon termination of a lease comprising the identity (Ei) of the leased item and the reason for the termination of the lease (Rt); a processor for calculating the value of the remaining periodic payments according to the lease contract (Rv), a breakeven amount (Bv) wherein Bv={Rv−[(Rt−Ht)*Hlr*Hu]}; and for selecting a termination fee (Ft) ranging from Rv to Bv.

DETAILED DESCRIPTION OF THE INVENTION

Figure 1:
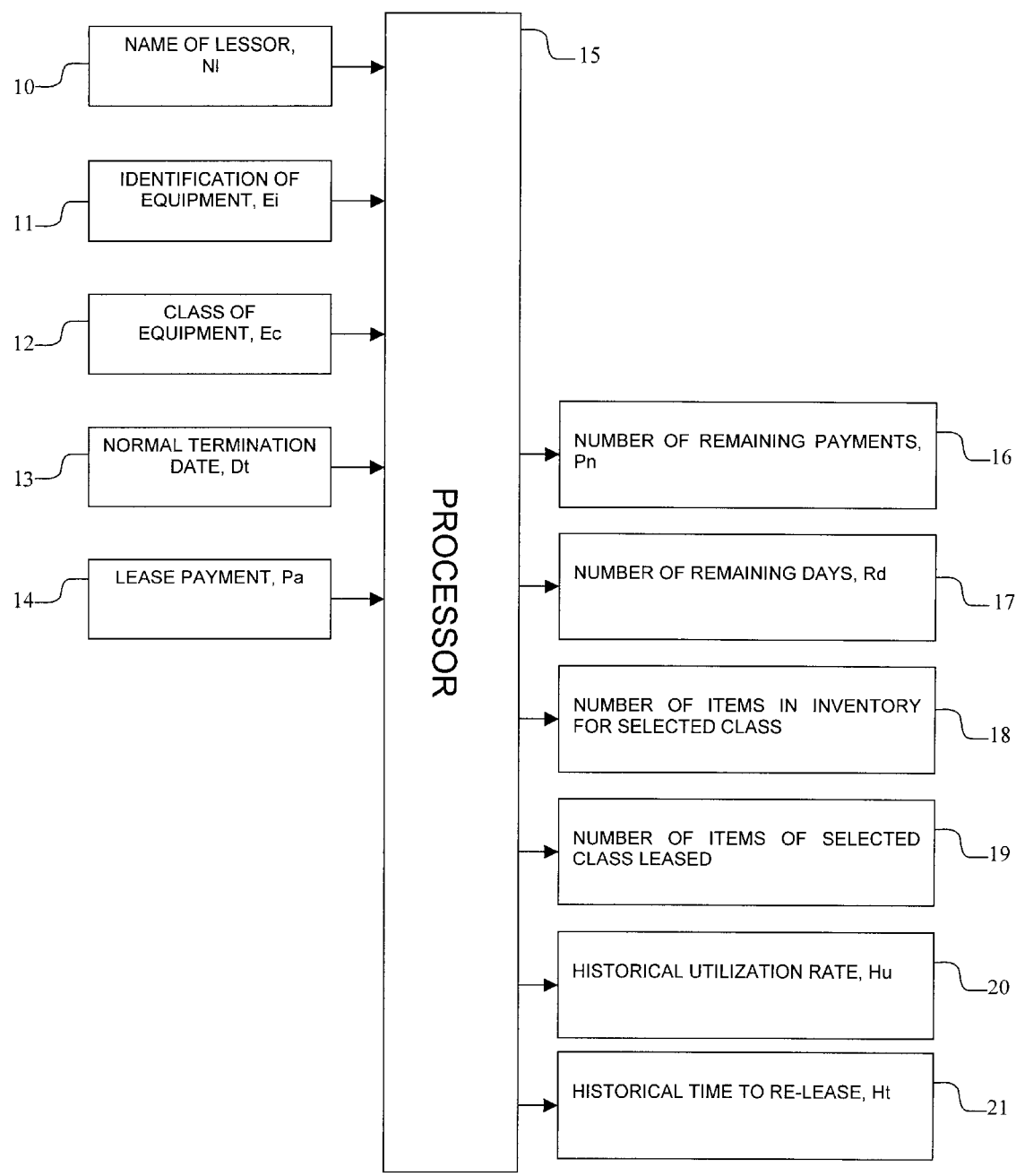
FIG. 1 is a block diagram of an aspect of an embodiment of the invention.

An embodiment of the present invention will be described below with reference to the accompanying drawings. Referring first to FIG. 1, the present invention will be outlined.

FIG. 1 depicts the concept of the computer-assisted method for managing the cancellation of equipment lease contracts on the date prior to the date set forth in the contract. A database of lease contracts is preferably stored in memory on a computer server, which is in communication with a plurality of workstations. The communication can be by any client-server architecture, including, for example, a corporate intranet. At a workstation, when a lease contract is created, the name of the lessor, L 10, is entered in an account entry along with the identification of equipment being leased, Ei 11, the termination date, Dt 13, and the lease payment, Pa 14. The class of equipment, Ec 12, can be entered or can be derived by the processor 15 from identification of equipment 11. The account entry for each lease can include the number of remaining payments, Pn 16, which can be calculated by the process 15, or by comparing the normal termination date 13 to the current date or by comparing the number of payments already made to the calculated total number of payments based on the normal termination date 13. The number of remaining days, Rd 17, can also be automatically calculated for each account entry. The preferred system of the invention includes a module which comprises all of the items in inventory for each class 18, and the number of items of each class already leased 19. By comparing the number of items of a particular class subject to lease contracts 19 with the total number of items owned for that class 18 over a period of time, for example 1, 5, or 10 years, an historical utilization rate, Hu 20, can be calculated by the processor 15.

The preferred system also comprises a module which compares for each piece of equipment in a particular class of equipment the termination date, whether early or normal of each terminated lease with the date a new lease for that specific piece of equipment is created, sums the time and divides by the number of terminated leases to automatically calculate an average historical time to re-lease equipment of any particular class, Ht 21.

Figure 2:
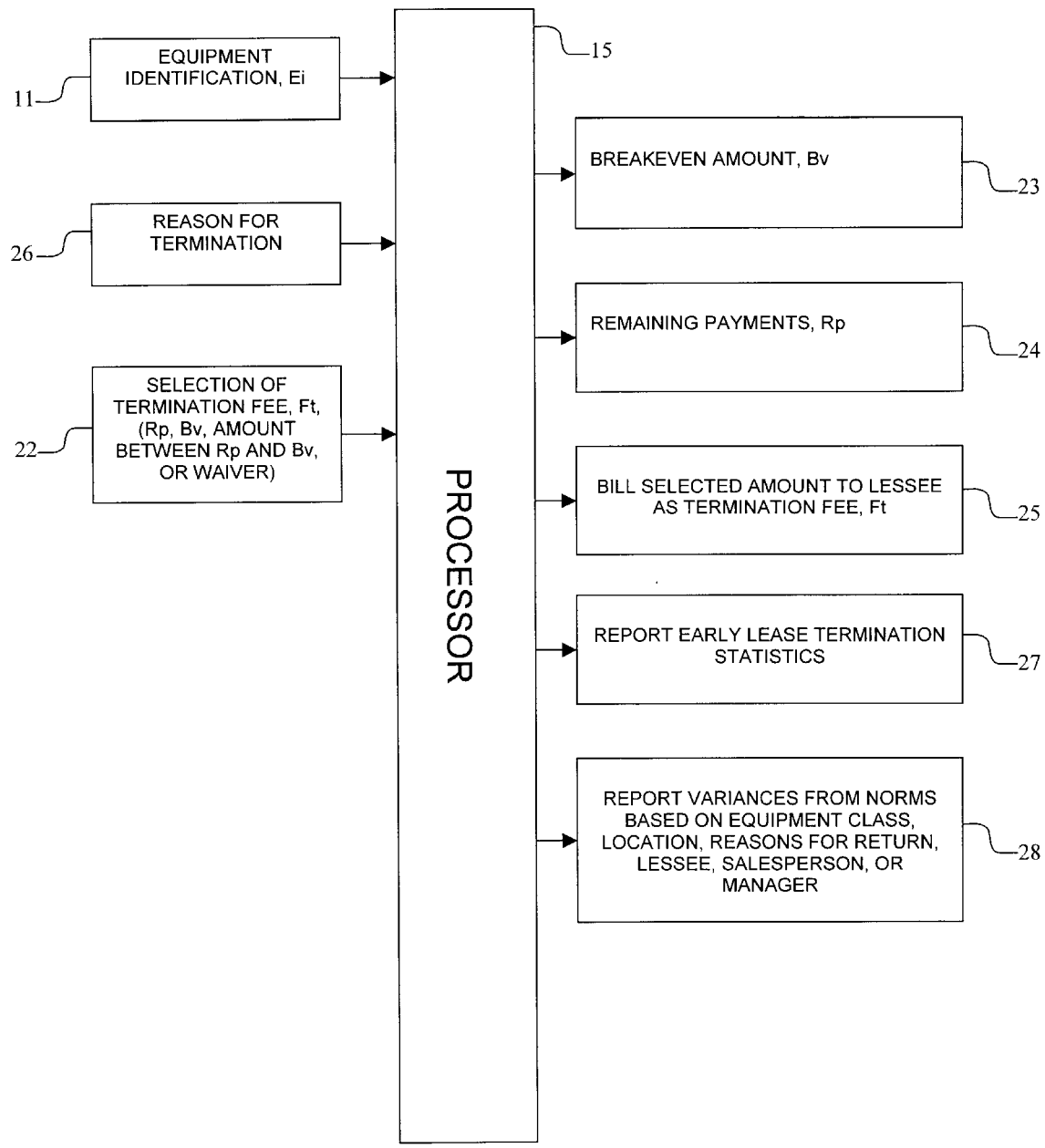
FIG. 2 is a block diagram of an embodiment of a termination process of the invention.

Referring now to FIG. 2, with the information residing in the various modules on the server, or which can be automatically calculated from the information stored in databases to which the server has access, and to which clients at various workstation locations have access to via the server or servers, on the occasion of a termination of a lease on a date prior to the date set forth in the contract, the account entry of the lease contract is called up at a workstation, for example, by entering the equipment identification Ei 11 or by identifying the contract number (not shown). The processor then calculates the sum of the remaining payments, Rp 24, which can be, for example, the calculated number of remaining payments, Pn 16, times the lease payment amount, Pa 14. Rp 24 also represents the maximum amount to be expected by a lessor in the event of an early termination. At the same time, the system of the invention using processor 15 calculates break-even amount, Bv 23, according to the formula $Bv=\{Rp-[(Rt-Ht)*Hlr]*Hu\}$. In the formula, the remaining time, Rt, and the historical time to lease items of the class following the return of the item of the class to inventory after a previous lease is terminated, Ht, are in the same units as each other and as the historical lease rate, Hlr. An example of such a calculation follows:

| | |
|---|---|
| Equipment Identify (Ei): | (1) Trailer |
| Equipment Class (Ec): | 53 foot Dry Freight Van |
| Original Term: | 60 months |
| Executed Term: | 36 months |
| Payments cycle: | 1 per month |
| Remaining Term (Rt): | 24 months |
| No. of Remaining Payments (Pn): | 24 |
| Payment Amount (Pa): | $360 |
| Historical Lease Rate (Hlr): | $350 |
| Historical Utilization (Hu): | 70% |
| Historical Time (Ht): | 2 months |
| Sum of Remaining Payments (Rp) | = Pa x Pn |
| | = $360 x 24 |
| | = $8640 |
| Breakeven Amount (Bv) | = {Rp − [(Rt − Ht) x Hlr] x Hu |
| | = $8640 − [(24 mo − 2 mo) x $350/mo] x 70% |
| | = $3250 |

Fee Range per unit = Between $8640 and $3250

At this point of the process, the person negotiating the termination of the lease contract is presented at a workstation with both Bv 23 ($3250 in the case of the example) and Rp 24 ($8640 in the case of the example), which occurs instantaneously after the contract identification 11 is entered into the system. That person then has the advantage in the negotiation of knowing both the contracted amount Rp and the break-even value Bv, which is normally the very minimum at the lessor will settle. Depending on the reason of the termination, the relationship with the lessee, and various other business factors, the negotiations for the lessor may select a termination fee of either Rp, Bv, or an amount in between. In some cases, the termination fee can be waived completely even though it is below Bv, but preferably such waiver is only with authorization from a higher level of management then the person negotiating the termination fee. Selection amount 22 is entered into the system and the system automatically bills the selected amount to the lessee as the termination fee 25. The system also automatically reports early lease termination statistics 27, which may be in a form which can be sorted by lessee, equipment class, difference between Rp and Ft, location, person negotiating the termination, reasons for return, or other categories or fields.

By systematizing the process of canceling lease contracts on the date prior to the date set forth in the contract, norms can be established and variances from the norms measured and reported 28. Such variances can be based on equipment class 12, location, reasons for return, Rc, lessee, sales person, manager, and the like. Such reports can be used to identify areas in the process, which vary by certain amounts, for example, 1, 2, 3, 4, 5, or 6 standard deviations, from the norm or the target. The system can also be used to improve the average termination fee collected by implementing the improvements to the processes mentioned above.

A lease contract may include a plurality of items of equipment, for example, thirty trucks, and less than all of the plurality of items of equipment may be subject to cancellation on a date prior to the date set forth in the contract, or each item may be returned at a different date. In such a case, Bv is preferably calculated separately for each item of equipment subject to cancellation, and the total Bv for the items of equipment under lease contract also is calculated.

The average utilization rate, Hu 20, can be calculated on a daily, monthly or different time basis, but preferably it is calculated by determining an average daily utilization rate and dividing a number of items of a particular class of equipment by the number of items of that class leased for each day. Ht 21 is generally calculated by determining an average time between the date of lease termination for each item of a particular class and the date of the item of the class is leased again. Hlr represents the historical periodic payment rate for the class of equipment specified in the lease agreement and Dr represents a discount rate which is the average ratio of the lease rate to the periodic rate for a plurality of historical lease contracts.

While the forgoing has illustrated the principles of the invention, various modifications, changes, alterations and improvements should readily occur to those skilled in the art without departing from the spirit and scope of the invention.

What is claimed is:

1. A computer assisted method for managing the cancellation of equipment lease contracts on a date prior to the date set forth in the contract comprising:

creating a database of lease contracts comprising a plurality of account entries, each account entry including lease contract information comprising the name of the lessor (Nl), the normal contract lease termination date (Dt), the amount (Pa) and remaining number (Pn) of periodic payments, the remaining time on the contract at termination (Rt), the identity (Ei) and class (Ec) of equipment which is the subject matter of the lease contract;

calculating the number of items of the class of equipment presently in inventory, the number of items of the class which are presently leased, the historical utilization rate of the class (Hu), the historical lease rate (Hlr), and the historical time to lease items of the class following return of item of the class to inventory after a previous lease is terminated (Ht), wherein Hu is calculated by determining an average daily utilization rate, the daily utilization rate calculated by dividing the number of items of a class of equipment owned by the lessor by the number of items of that class leased for each day;

inputting data upon termination of a lease comprising the identity (Ei) of the leased item and the reason code for the termination of the lease (Rc);

calculating the sum of the remaining periodic payments (Rp) according to the lease contract wherein $RP=Pa*Pn$;

calculating a breakeven amount (Bv) according to a formula as follows:

$$Bv=\{Rp-[(Rt-Ht)*Hlr]*Hu\}; \text{ and}$$

billing the lessee a termination fee (Ft) no higher than Rp and no lower than Bv.

2. The method of claim 1, wherein the lease contract includes a plurality of items of equipment and less than all of the plurality of items is subject to cancellation on a date prior to the date set forth in the contract, Bv is calculated separately for each item of equipment subject to cancellation, and the total Bv for the items of equipment under the lease contract is also calculated.

3. The method of claim 1, wherein Ht is calculated by determining an average time between the date of lease termination for each item of the class and the date the item of the class is leased again.

4. The method of claim 1, wherein $Hlr=Hr*Dr$ wherein Hr represents the historical periodic payment rate for the class of equipment specified in the lease agreement and Dr represents a discount rate which is the average ratio of lease rate to periodic rate for a plurality of historical lease contracts.

5. The method of claim 1, wherein historical Ft's and corresponding Rt's for a plurality of lease terminations are calculated, trends are determined, variances from statistical norms are calculated, and the historical Ft's and corresponding Rt's, trends, and variances are periodically reported in reports.

6. A system for managing the cancellation of equipment lease contracts on a date prior to the date set forth in the contract comprising a database of lease contracts comprising a plurality of account entries, each account entry including lease contract information comprising the name of the lessor, the normal contract lease termination date (Dt), the amount (Pa) and number (Pn) of periodic payments, the remaining time on the contract at termination (Rt), the identity (Ei) and class (Ec) of equipment which is the subject matter of the lease contract;

a database of all classes of equipment (Ec) owned by the lessor, each entry comprising the identity of the class of equipment, the number of items of the class of equipment presently in inventory, the number of items of the class which are presently leased, the historical utilization rate of the class (Hu), the historical lease rate (Hlr), and the historical time to lease items of the class following return of item of the class to inventory after a previous lease is terminated (Ht), wherein Hu is calculated by determining an average daily utilization rate, the daily utilization rate calculated by dividing the number of items of a class of equipment owned by the lessor by the number of items of that class leased for each day;

a processor for calculating the value of the remaining periodic payments according to the lease contract (Rv), a breakeven amount (Bv) wherein $Bv=\{Rv-[(Rt-Ht)*Hlr]*Hu\}$; and a client workstation for inputting data upon termination of a lease comprising the identity (Ei) of the leased item and the reason for the termination of the lease (Rt) and for selecting a termination fee (Ft) ranging from Rv to Bv.

7. The system of claim 6, further comprising means for calculating norms for Ft for each reason code Rc, and for calculating variances from the norms based on one or more of equipment class, location, sales person, and manager.

* * * * *